United States Patent [19]

Lockwood

[11] 4,369,629

[45] Jan. 25, 1983

[54] NATURAL ENERGY EXTRACTOR

[76] Inventor: Lawrence B. Lockwood, 5935 Folsom, La Jolla, Calif. 92037

[21] Appl. No.: 223,235

[22] Filed: Jan. 8, 1981

[51] Int. Cl.³ .............................................. F24J 3/00
[52] U.S. Cl. .................................... 60/698; 60/641.8; 60/716; 126/247; 126/417; 126/449; 290/55; 415/116; 127/427
[58] Field of Search ................. 60/641.12, 641.8, 698, 60/716; 122/26; 126/446, 247, 427, 449, 417; 415/115, 116, 180; 290/55; 165/85

[56] References Cited

U.S. PATENT DOCUMENTS

| | | | |
|---|---|---|---|
| 3,952,723 | 4/1976 | Browning | 126/247 |
| 4,143,522 | 3/1979 | Hamrick et al. | 126/247 X |
| 4,229,941 | 10/1980 | Hope | 60/698 X |
| 4,321,476 | 3/1982 | Buels | 60/641.12 X |
| 4,332,237 | 6/1982 | Kelsey | 126/247 |

FOREIGN PATENT DOCUMENTS

| | | | |
|---|---|---|---|
| 2524935 | 12/1975 | Fed. Rep. of Germany | 126/427 |
| 2625640 | 12/1977 | Fed. Rep. of Germany | 60/641.8 |
| 2757306 | 7/1979 | Fed. Rep. of Germany | 60/698 |
| 7536253 | 6/1977 | France | 60/698 |

*Primary Examiner*—Sheldon J. Richter
*Attorney, Agent, or Firm*—Charmasson, Branscomb & Holz

[57] ABSTRACT

The invention is a multiple-mode energy utilization device combining elements which extract solar energy, those which utilize wind energy, and those utilizing rising convection currents caused by heated air. In one principal embodiment, a wind rotor on a vertical axis is provided with solar cells on its surfaces and a heat conductive axle in direct contact with a hot water tank in which there are paddle blades for pumping and frictionally stirring water or other fluid, and an electric heater in the water to utilize extra energy from the electric generator run by the shaft as well as the solar cells, which electrical energy would ordinarily charge storage batteries unless such charge was not needed which would cause the water heater to energize. Additional rotational and heat energy are generated by a hood disposed beneath the rotor which houses a heat sink which passes therethrough hot updrafts from a flat plate collector on which the rotor is mounted, as well as water from the flat plate collector to provide additional heat to the flat plate system.

7 Claims, 21 Drawing Figures

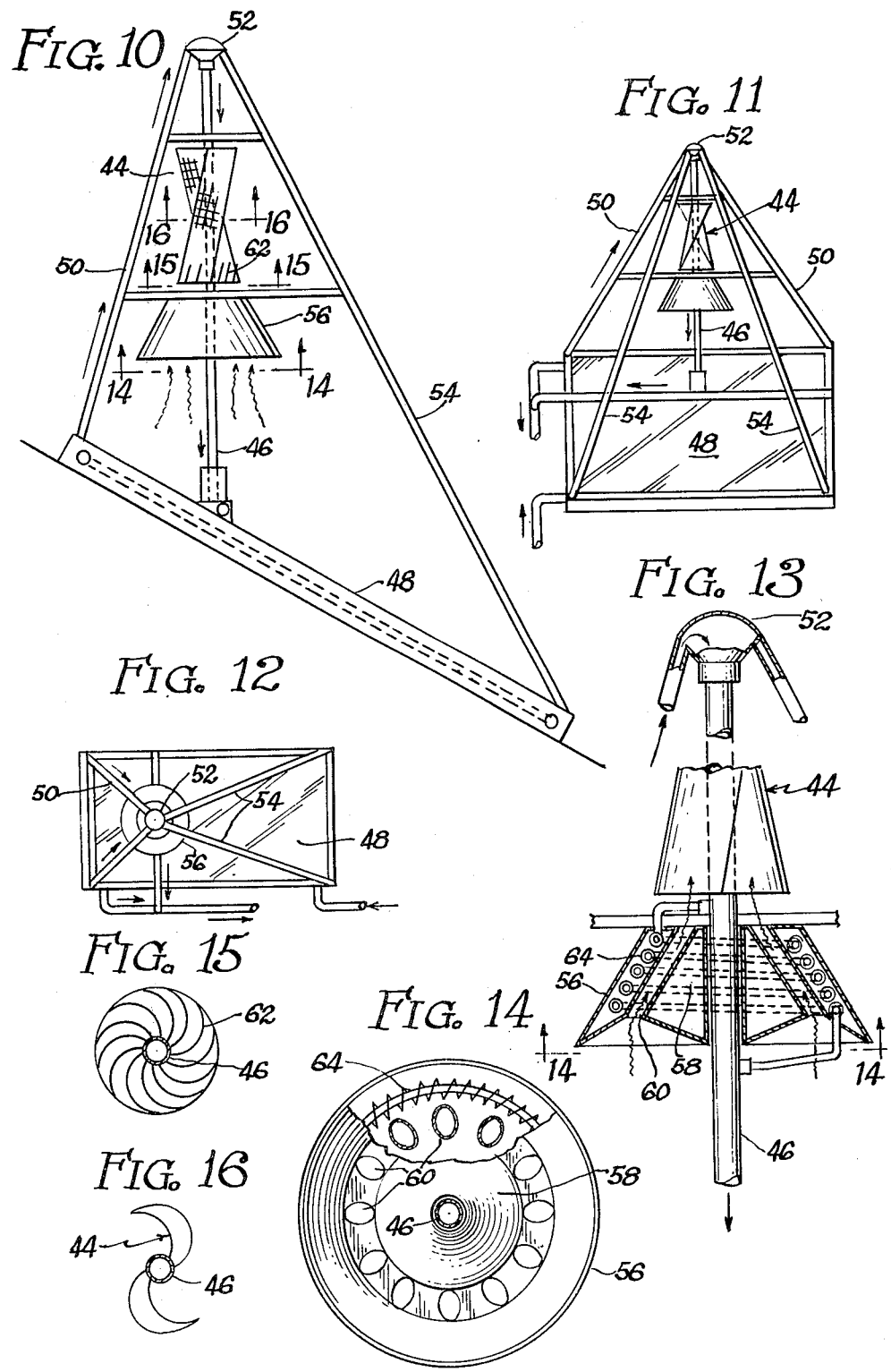

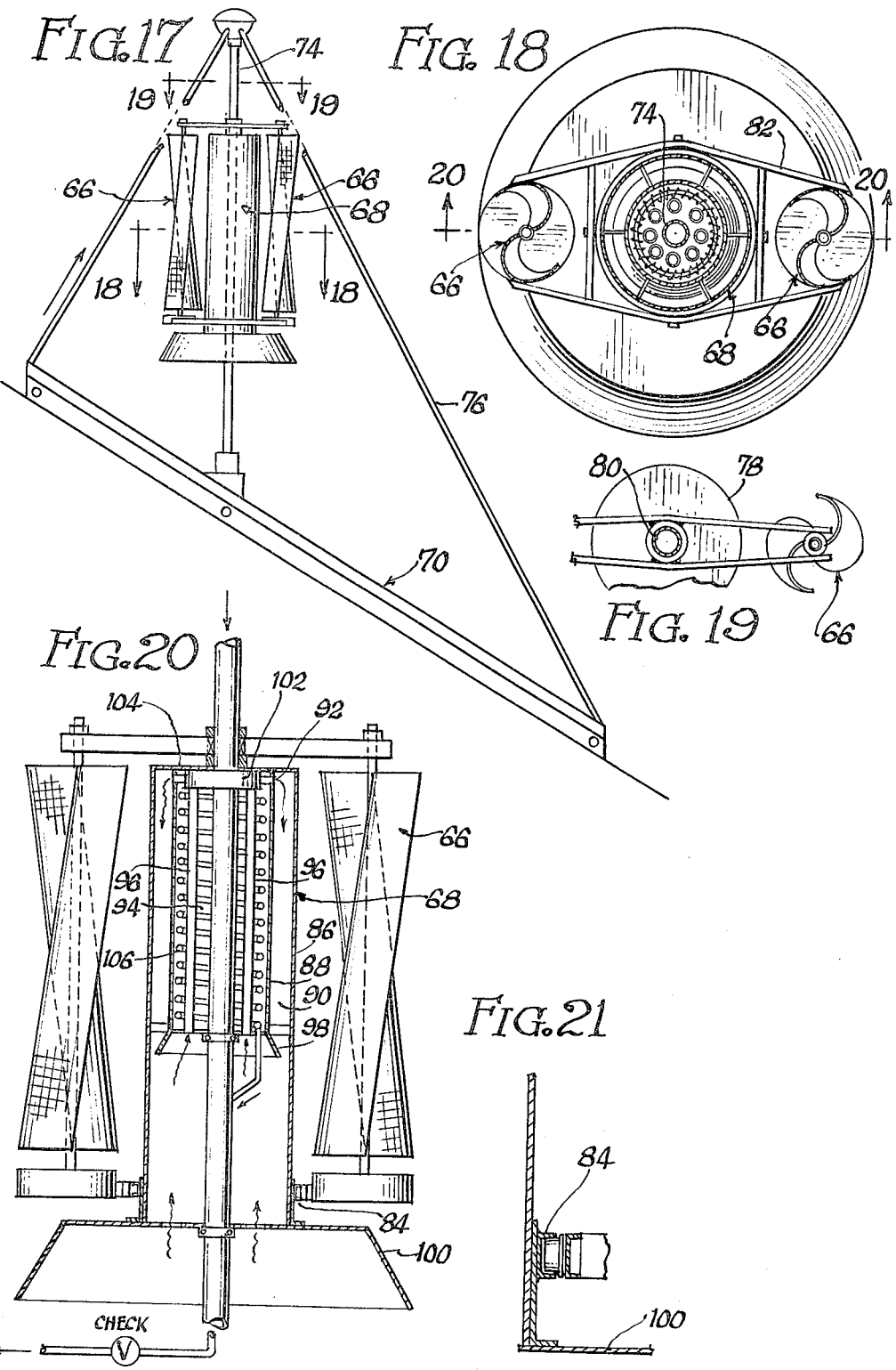

NATURAL ENERGY EXTRACTOR

BACKGROUND OF THE INVENTION

With the explosion of interest in solar energy, numerous devices have been provided which are specific to one aspect of solar or wind energy recoupment. However, inasmuch as the quality of a solar or wind system is largely dependent on the area and volume that it occupies, it is advantageous that other, perhaps secondary, sources of energy which are available at the site of the principal energy transducer device be taken advantage of.

These secondary sources are, for example, the solar energy that falls on the vanes of a wind rotor, which ordinarily serves no useful function; the friction of the rotor itself on its bearings, again generally wasted; updrafts caused by flat plate collectors which, no matter how efficient, conduct considerable heat to the ambient air causing hot spots; and, in addition, the heat generated in the vanes of a wind rotor from solar and other sources.

SUMMARY OF THE INVENTION

The present invention takes advantage of all such secondary energy sources in the area of deployment of the device of the instant invention and in its principle, most all-encompassing embodiment mounts a vertical-axis wind rotor directly above a solar flat plate collector. The wind rotor itself utilizes vanes which mount photoelectric solar cells communicating with an electric utilization means through wipers and slip rings on the shaft, the sun's rays against these vanes further being taken advantage of by virtue of the rotor shaft which is hollow and passes water therethrough into a tank at one end of the rotor which also serves as a pump house. Heat conducted through the vanes through the central shaft is passed into this centrifugal pump housing, and blades attached to the shaft rotate the water in the housing causing a pumping action.

The water thus pumped comes from and returns to a flat plate collector after picking up whatever additional heat is passed into the centrifugal pump by virtue of the rotor shaft.

The shaft also drives a generator, which together with the slip rings provides an electrical energy source which can alternatively be diverted back into the centrifugal pump tank if it is not needed to recharge the batteries or operate other electrical appliances.

A hood position just beneath the rotor captures updrafts from the flat plate which are directly to the wind rotor in the case of a horizontal axis model, and pass up through a wind vane mounted in the bottom of the rotor if the rotor utilizes a vertical axis. In the vertical axis embodiment, a heat sink is disposed in the hood beneath the rotor and water passing through this heat sink through pipes communicating with the flat plate collector will pick up the additional heat invested into the heat sink by the updrafts from the flat plate. It can thus be seen that the rotor will rotate either if there is a strong wind, or if there is hot sun to create sufficient updrafts. Additionally, by routing hot water from the underlying flat plate collector up through a heat sink surrounding the updraft plates, the updraft air can be heated additionally by heat bled from the heat sink to speed it up and thus cause rotation of the rotor at a higher velocity regardless of the absence of wind.

In another embodiment, the same basic vertical axis concept is used but two rotors are incorporated alongside a central drum whose principal purpose is to divert the wind into the laterally positioned rotors to multiply the effective wind speed by up to a factor of two, which quadruples the amount of energy available from each rotor. Additional energy is extracted from the environment by this central drum which is a coaxial double cylinder, the outer cylinder being transparent and the inner cylinder darkened to create a greenhouse effect between them. The inner cylinder also contains a heat sink through which recirculated hot air and hot water from the flat plate is used to power some utilization means such as a Sterling engine disposed in the upper portion of the heat sink material.

BRIEF DESCRIPTION OF THE DRAWINGS

FIG. 10 is a side elevation view of the second embodiment of the invention;

FIG. 11 is a side elevation view of the device of FIG. 10 seen from the right;

FIG. 12 is a top elevation view of the embodiment of FIGS. 10 and 11;

FIG. 13 is a section of the rotor and hood portion of the second embodiment with portions cut away;

FIGS. 14 through 16 are sections taken as indicated in FIG. 10;

FIG. 17 is a side elevation view of a third embodiment of the invention;

FIGS. 18 and 19 are sections taken in FIG. 17 where indicated;

FIG. 20 is a front elevation view of a third embodiment with portions in section; and FIG. 21 is a detail of the track which mounts the rotors of the third embodiment.

DETAILED DESCRIPTION OF THE PREFERRED EMBODIMENTS

The first embodiment is illustrated in FIGS. 1 through 9 wherein a rotor 20 is mounted on a horizontal axis. The rotor itself is made from a central hollow shaft 22 having a pair of end plates 24 between which span the variably curved vanes 26 of a Savonius rotor, which is known for its even power output throughout its rotational cycle. Although this type of rotor vane is not novel in its application and other rotor styles could be used, it is shown throughout inasmuch as it would be advantageously deployed in the implementations disclosed herein.

Figure 1:
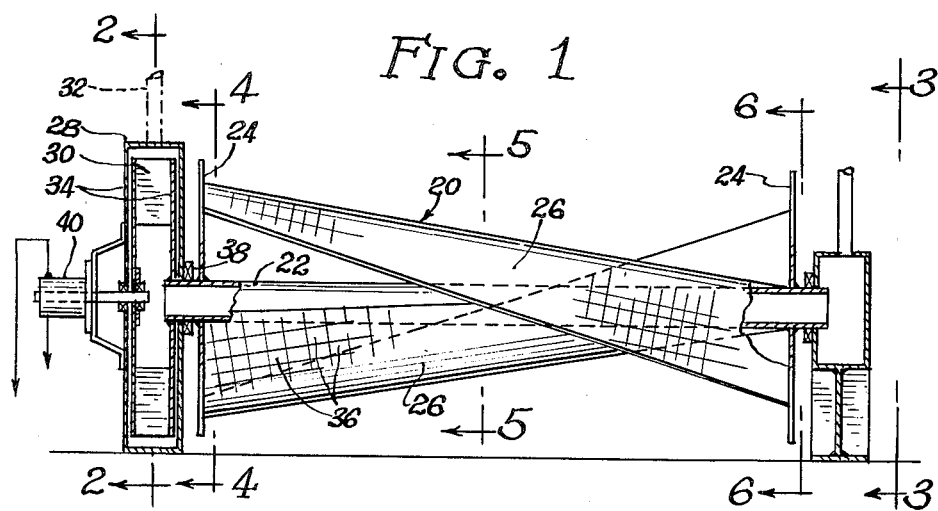
FIG. 1 is a front elevation view with the ends in section of a horizontal axis rotor.
Figure 2:
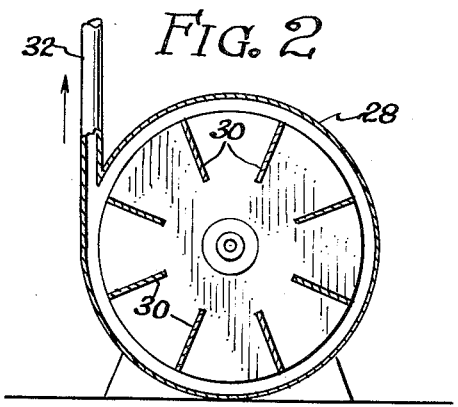
FIGS. 2 through 6 are sections taken along FIG. 1 as indicated in that figure.
Figure 3:
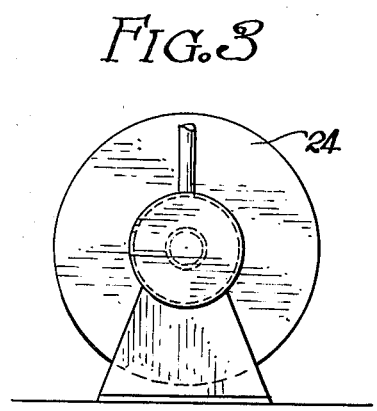
Figure 4:
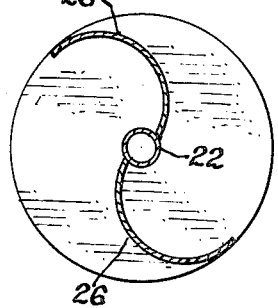
Figure 5:
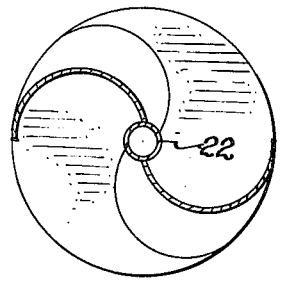
Figure 6:
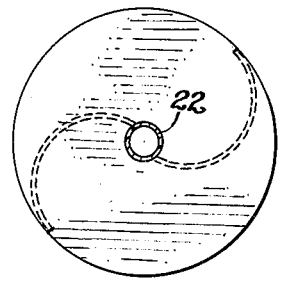
Figure 7:
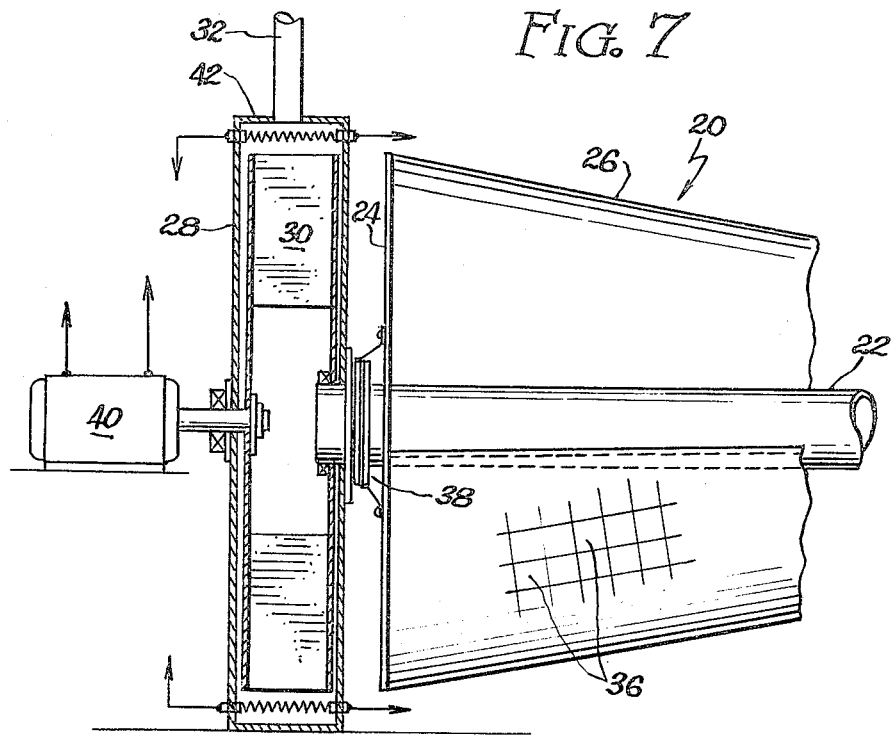
FIG. 7 is a detail of the left end of the embodiment of FIG. 1.

The shaft 22 on which the rotor is mounted is journaled in sealed relation inside a cylindrical housing 28 which also serves as a water tank, and a plurality of centrifugal fan blades 30 are mounted to the end of the shaft as best shown in FIGS. 1 and 7 such that as the shaft and blades rotate, the housing 28 encloses what amounts to a centrifugal pump which feeds through the hollow shaft 12 and exits at outlet port 32.

The vanes 26, as well as the hollow shaft 12, are made of a heat-conductive material such as metal, so that heat transferred to the metallic parts are subsequently transferred to a fluid, ordinarily water, which flows from right to left in FIG. 1 through the hollow shaft 12 and into the pump 28. The fan blades 32 are mounted between two disks 34, at least the right of which is metallic or at least heat-conductive, to further assure the transfer of all heat from the hollow shaft 22 into hot water within the pump. Additionally, frictional heat which would ordinarily be a loss, is no longer a loss inasmuch as it is incorporated in the heating effort of the water and the centrifugal pump.

Thus, it can be seen that in addition to capturing the energy inherent in wind, the rotor also transmits heat energy, most of which is derived from the sun, but also that resulting in friction in the system, into the water storage system. In addition, the surfaces of the vanes 26 are preferably covered with a layer of photovoltaic cells 36 which are coupled into a slip ring-wiper electrical transfer system 38.

Figure 8:
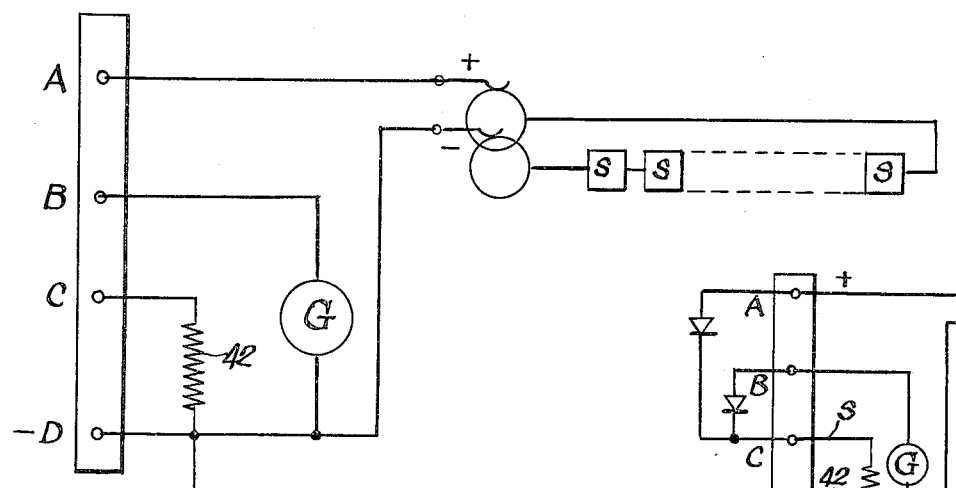
FIGS. 8 and 9 are schematic diagrams of the generator and photovoltaic cell electrical connections.
Figure 9:
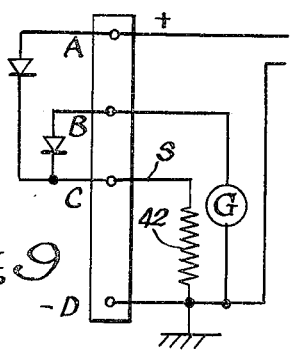

Also, an electrical generator 40 is operated by shaft power so that there are two sources of electrical power in addition to the heat delivered to the water in the centrifugal pump. These two electrical sources are incorporated into a circuit as shown in FIGS. 8 and 9. In both these systems, it can be seen that a diagrammatically illustrated element 42, also seen in FIG. 7, is placed inside the centrifugal pump 28 and can be used to reinvest the energy derived and converted to electrical power back into the water as heat. Control systems could be provided into the circuitry illlustrated in FIGS. 8 and 9 to regulate whatever balance is desired between electricity requirements and maintenance of a certain temperature inside the tank/pump 28 so that only an elemental electrical system showing output terminals A, B, C and D is shown in FIGS. 8 and 9.

Thus, not only is energy derived from the sun, from ambient heat, and from the wind, but it is provided in two forms, the heated water within the tank/pump and the electrical energy derived from the solar cells and the generator which could either be utilized as electrical power or added as heat to the circulating water.

Turning to the second embodiment, FIGS. 10 through 16 illustrate a modification in which the rotor 44, having the same basic vane construction as the first embodiment, is mounted on a vertical axis 46 which is also hollow, as was the first axis. The unit, however, is mounted atop a solar flat plate collector 48 shown in the illustration as being on a characteristic angle. Mounting is achieved by a pair of upper pipes 50 connecting to the vertex 50 of the structure and a pair of lower supports 54, together with the hollow axis 46, already mentioned.

In addition to the basic rotor structure mentioned in discussing the first embodiment of the instant invention, the rotor of the second embodiment incorporates a stationary skirt or hood 56 just below the bottom of the rotor itself. The axis 46 is also stationary. Inside this hood is a heat sink 58 which could be, for example, of a salt solution of a saturation such that higher temperatures cause it to liquify and lower temperatures cause it to crystallize, thus utilizing the latent heat sink capabilities of the change of the state to enhance the material's efficacy.

Throughout the heat sink material pass, a plurality of hot air pipes 60, best shown in FIGS. 13 and 14, which direct air rising from the heated flat plate collector 48, as shown in FIG. 10, against a wind vane 62, shown in FIG. 15, which is horizontally oriented, perpendicular to the vertical axis 46, and mounted to the bottom of the rotor 44. This updrafting hot air causes the rotor to rotate in the same sense as it does when impinged upon wind, such that even in a completely static ambient air condition, provided the sun is out, the updrafts created by the flat plate collector will, nevertheless, rotate the rotor.

To increase the heat of the updrafting hot air in the pipes 60, hot water from the plate collector passes upwardly through the pipes 50 and downwardly through the central hollow axis which, when it reaches the area adjacent to the heat sink 58, is diverted through a series of finned coils 64 where it passes some of its heat to the heat sink, which subsequently transfers it to the rising hot air in the pipes 60, which must turn the rotor.

The system shown in FIGS. 10 through 16 could be utilized as a conventional hot water solar heater, or the flat plate could be incorporated strictly as a means to enhance the rotational velocity of the rotor. Energy is taken off the rotor either in the same fashion as was shown in the first embodiment, i.e., by means of heating water in a centrifugal pump/tank, or the solar cell/electrical generating system also discussed in the first embodiment, or a combination of these two.

Turning now to the third embodiment shown in FIGS. 17 through 21 of the drawings, still the basic rotor of the first two embodiments is used, this time being designated 66. In this embodiment, the rotor 66 is duplicated, each of which is mounted on a vertical axis alongside a central drum 68 which also has a vertical axis. The central drum approximately doubles the speed of wind along the sides, causing an even greater increase in the available wind energy. Again, a flat plate 70 is used having hot water riser pipes 72 which double as structural supports and empty into a stationary vertical 74 which also serves as an axle for the rotor system. Auxillary supports are shown at 76.

The rotors are mounted as is best seen in FIGS. 18 and 19 on upper hangar bar 78 shown in FIG. 19 which is journaled at 80 onto the vertical pipe 74 and at its outer exteremities journals the top ends of the shafts on which rotate the rotors 66. In FIG. 18, an additional oval support bar 82 is shown, again which rotationally tracks on the exterior surface of the drum 68, so that both rotors may concommitantly adjust to the wind. The tracking of the oval support 82 in the drum is shown at 84, detailed in FIG. 21. There would also probably be requred some means of stopping or damping the dual rotor support structure so that it would not go into rapid orbital motion, but would restrain itself to adjustments into the wind.

An additional energy source is provided by the drum 68. The drum consists of an outer transparent cylinder 86 and an inner darkened cylinder 88 which together define a dead, greenhouse space 90 therebetween which is topped by a disk 104.

Within the inner cylinder 88 is another heat sink 94 through which passes hot air pipes 96 which draw hot air from the secondary hood 98 from the greenhouse space 90 which is, in turn, fed by the primary skirt of the hood 100. As this heated air passes up through the heat sink 94, at the top it is utilized by a utilization means such as Sterling engine 102 which is very diagrammatically illustrated, but which juxtaposes the heated air from the hot air pipes against an external, cooler air source to create mechanical energy in any convenient fashion (the central drum, of course, does not rotate). Ducts 92 return the air from the Sterling engine back to the greenhouse space 90, so that a continuous air thermosiphon is created. If, under certain circumstances, this thermosiphon should operate backwards, it is of no consequence and the system will work equally well.

Again passing through the heat sink material are finned coils 106 through which passes the hot water circulated from the vertical pipe 74 received from the flat plate collector. An auxiliary pump should be used, or the thermosiphon effect could be counted on to deliver hot water from the flat plate into the heat sink to warm the air in the air pipes 96 to operate the Sterling engine.

In this embodiment, as in the others, rather than providing a single-energy source utilization means which is ineffective should, for example, the wind stop, or the sky become cloudy, the instant invention in all of its implementations provides multiple source energy transducer structure as well as storage provisions utilizing directly and indirectly both solar and wind power to create heated water and electricity, together or in the alternative, to partially satisfy the needs of a residence or small business.

What is claimed is:

1. A wind rotor comprising:
   (a) a heat-conductive rotary shaft;
   (b) heat conductive wind vanes extending from said shaft to deliver absorbed solar heat to said shaft; and
   (c) heat accumulation means operative with said shaft to collect the heat delivered therefrom.

2. Structure according to claim 1 wherein said heat accumulation means comprises a fluid-filled tank adjacent one end of said shaft, there being heat-conductive structure integral with one end of said shaft and contacting fluid in said tank.

3. Structure according to claim 2 wherein said shaft is hollow and said heat accumulation means comprises at least in part fluid disposed in said shaft.

4. Structure according to claim 3 wherein said shaft drains into a stationary cylindrical tank coaxial with one end of said shaft and having a peripheral outlet, said shaft mounting a plurality of radial blades disposed in said tank to define a centrifugal pump to draw fluid through said shaft and deliver same out said outlet.

5. Structure according to claim 4 and including electrical heating elements mounted in said tank with a source of electricity to serve as a supplemental fluid heater.

6. Structure according to claim 5 wherein said source of electricity comprises a generator operated by said shaft.

7. Structure according to claim 5 wherein said source of electricity comprises photovoltaic cells mounted on said vanes.

* * * * *